United States Patent
Pruitt et al.

(10) Patent No.: US 6,412,570 B1
(45) Date of Patent: Jul. 2, 2002

(54) DRAW BAR SWIVEL HITCH

(75) Inventors: Martin E. Pruitt, Hesston; James W. Schroeder, Newton; Jeffrey S. Funk, Hillsboro, all of KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 09/785,740

(22) Filed: Feb. 16, 2001

(51) Int. Cl.$^7$ .............................................. A01B 59/043
(52) U.S. Cl. .................... 172/449; 172/678; 280/416.2; 56/15.7
(58) Field of Search .......................... 172/439, 440–443, 172/449, 450, 677, 679, 680, 678; 74/15.2; 56/15.1, 15.2, 15.7, 12.6, 15.9; 280/416.2

(56) References Cited

U.S. PATENT DOCUMENTS

| | | |
|---|---|---|
| 3,450,220 A | 6/1969 | Frandsen et al. |
| 4,340,240 A | 7/1982 | Anderson |
| 4,366,877 A | 1/1983 | Vissers et al. |
| 4,525,987 A | 7/1985 | Werner et al. |
| 4,714,123 A | 12/1987 | Ermacora et al. |
| 4,738,461 A | 4/1988 | Stephenson et al. |
| 4,776,606 A | 10/1988 | Stephenson et al. |
| 4,793,430 A | 12/1988 | Stephenson et al. |
| 4,805,927 A | 2/1989 | Stephenson et al. |
| 4,838,015 A | 6/1989 | Mouret et al. |
| 4,860,526 A | 8/1989 | Hottes |
| 4,923,014 A | 5/1990 | Mijnders |
| 5,099,937 A | 3/1992 | McLean |
| 5,146,737 A | 9/1992 | Gantzer |
| 5,152,357 A | 10/1992 | McLean et al. |
| 5,186,271 A | 2/1993 | McLean |
| 5,265,403 A | 11/1993 | Franet et al. |
| 5,355,971 A | 10/1994 | Austin et al. |
| 5,522,208 A | 6/1996 | Wattron |
| 5,531,283 A | 7/1996 | Austin et al. |
| 5,706,901 A | 1/1998 | Walters et al. |
| RE35,835 E | 7/1998 | Eidam et al. |
| 5,816,339 A | 10/1998 | Parsons et al. |

FOREIGN PATENT DOCUMENTS

| | | |
|---|---|---|
| DK | 3411672 | 3/1984 |
| EP | 0027295 | 10/1980 |
| EP | 0124462 | 4/1984 |
| EP | 0196263 | 3/1986 |
| GB | 1128958 | 1/1966 |
| NL | 8700863 | 4/1987 |

OTHER PUBLICATIONS

AGCO/Hesston Operator's Manual 1360 Rotary Mower Conditioner—Form No. 700 713 931 including the following pages: Outside cover page, inside cover pp. 7, 16, 19, 22, 28, 40, 41, Outside back cover–No date.

New Holland 1441 Operator's Manual 086586593 Dec. 1999 (Cover page and pp. 1–6 and 1–7).

945 Center Pivot Rotary Impeller Mower–Conditioner (Serial No. 119501–) Operators Manual—John Deere Ottumwa Works OME92870 Issue D7 (Cover page and pp. 20–5, 20–6, 20–7–no date–.

Primary Examiner—Robert E. Pezzuto
(74) Attorney, Agent, or Firm—Hovey Williams LLP

(57) ABSTRACT

A pull-type implement has operating components that are driven by a mechanical drive line on the tongue of the implement. An upper gear box is fixed to the front end of the tongue and a lower gear box swivels relative to the upper gear box about an upright axis passing through the two gear boxes. A hitch that establishes a draft connection between the tongue and the draw bar of a towing tractor has a fore-and-aft receiver that extends beneath the lower gear box and has a lower pivotal connection with the tongue at that location. A mast fixed to and projecting upwardly from the receiver has an upper pivotal connection with the tongue at a location above the upper gear box. The receiver has a forwardly facing socket that loosely receives the draw bar to permit the draw bar to swing up and down to a limited extent about a transverse axis and rotate side-to-side to a limited extent about a fore-and-aft axis when the draw bar is retained within the socket by a locking pin. One embodiment isolates both gear boxes from all draft loads, while a second, pull-through embodiment places a limited amount of draft loading on the lower gear box.

14 Claims, 5 Drawing Sheets

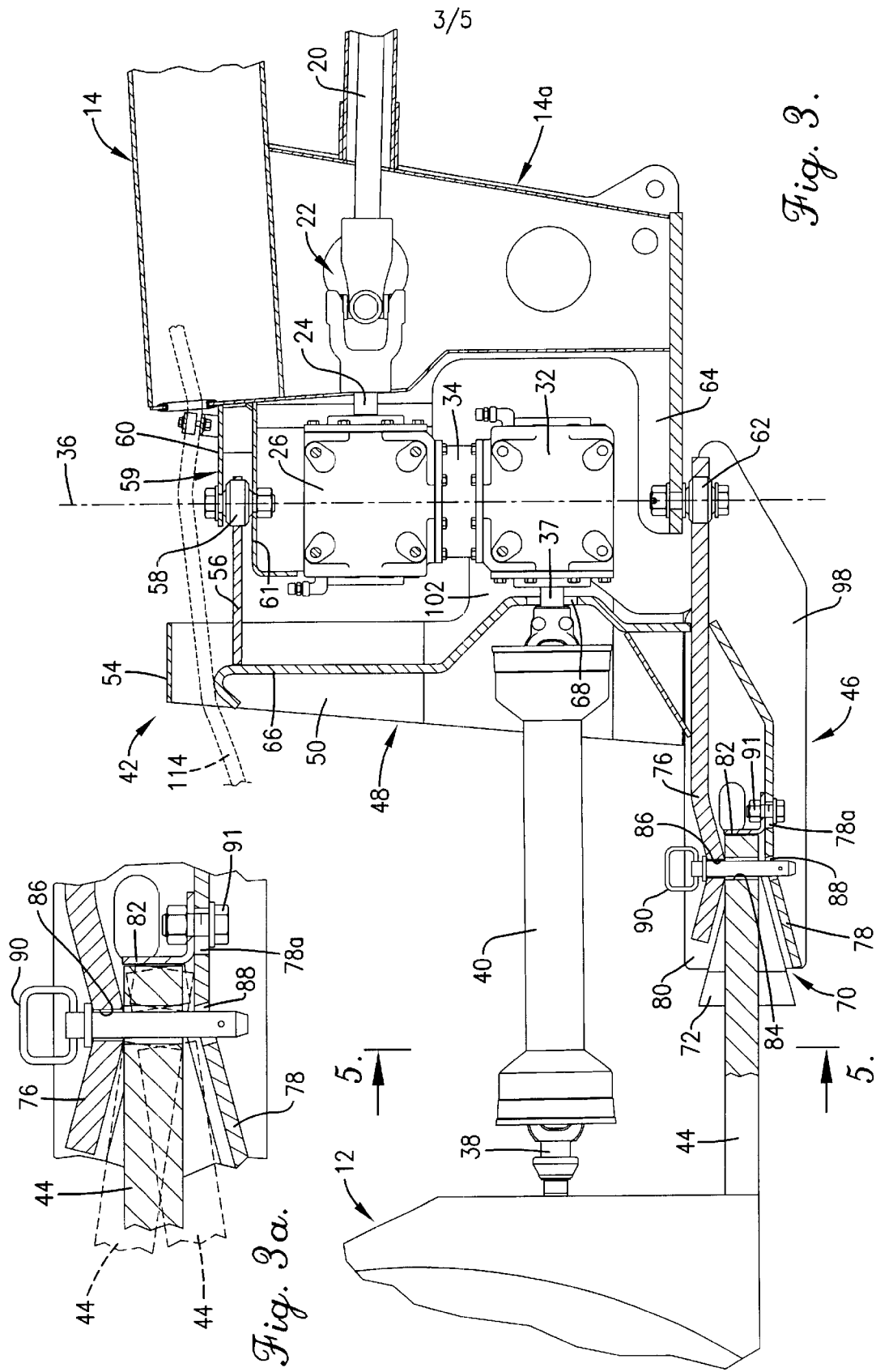

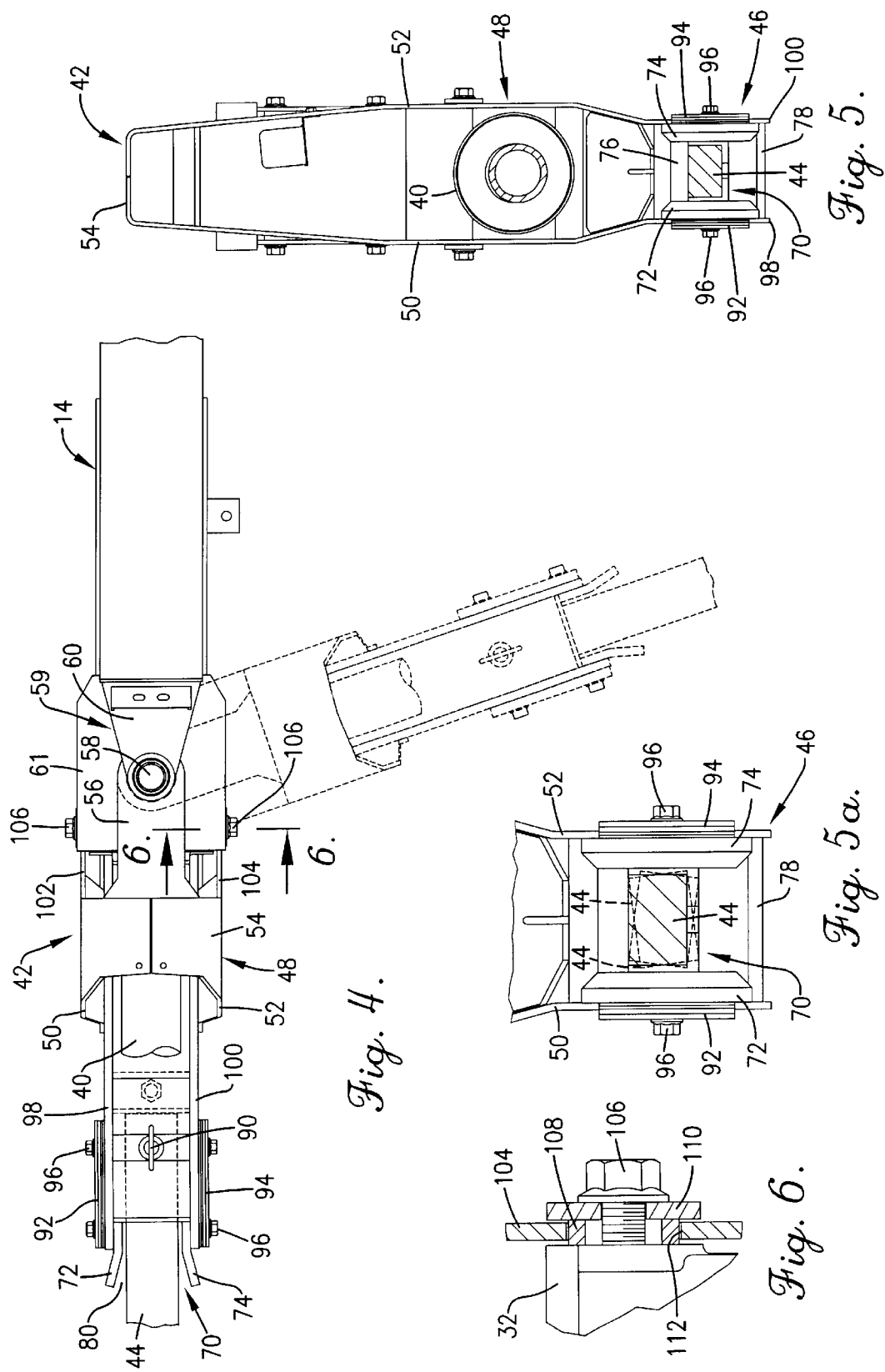

DRAW BAR SWIVEL HITCH

TECHNICAL FIELD

This invention relates to the field of pull-type farm implements and, more particularly, to a swivel hitch arrangement that allows the towing tractor and tongue of the pulled implement to be turned at relatively sharp angles relative to one another without adversely affecting the transmission of mechanical driving power from the power take-off shaft of the tractor to driven components of the implement.

BACKGROUND

Various types of swivel hitches are presently known. Some are designed for use with the lower links of the three point hitch of a conventional tractor, while others are designed to be connected to the draw bar of the tractor. Conventional draw bar swivel hitches often require the user to first bolt on a special adaptor to the draw bar before the implement can be hooked to the adaptor and readied for operation. Tools must be used to attach the adaptor, and time must be taken to complete the process that could otherwise be used for more advantageous purposes. Moreover, currently available draw bar swivel hitches are complex and do not necessarily distribute draft forces in the optimum manner.

SUMMARY OF THE INVENTION

The present invention contemplates a swivel hitch that permits the towed implement to be hitched to the tractor draw bar rather than the three point hitch. No adaptor must be attached to the draw bar, and, once the hitch has been initially adjusted for the particular draw bar at hand, no tools are thereafter required in order to establish a fully hitched condition between the implement and the draw bar. In a preferred form, a pair of stacked gear boxes, the lower one of which can swivel relative to the upper, are completely isolated from draft loads exerted between the tractor and the implement. Moreover, such draft loading is, in the preferred embodiment, distributed to a pair of separate locations, rather than concentrated in one central region as in certain conventional constructions.

A draw bar swivel hitch in accordance with the present invention has an upper right angle gear box that is fixed to the tongue and a lower right angle gear box that swivels relative to the upper gearbox about an upright axis. A hitch is pivotally attached to the tongue for horizontal swinging movement about the upright axis of the swivel gear boxes, and such hitch has a receiver at its lowermost end provided with a forwardly facing draw bar socket. The draw bar socket is adapted to rather loosely receive the rearwardly extending draw bar of the towing tractor such that, when fully received within the socket and retained therein by a king pin or the like, the draw bar can pivot up and down about a transverse pivot within a limited range of motion and can also rotate to a limited extent about a fore-and-aft axis through the socket, thus accommodating the necessary pitching and rolling action between the tractor and the implement. The hitch is operable to swivel the lower gear box to the extent necessary to keep its input shaft always in line with the power take-off shaft of the towing tractor. In a preferred embodiment, a pair of laterally spaced, rearwardly extending arms embrace the lower gear box on opposite sides thereof to effect the necessary steering action, but no draft loads are imparted to the lower gear box because all such loads are transmitted through a pair of upper and lower, vertically spaced pivots between the hitch and the tongue at locations above and below the gear boxes respectively.

An alternative embodiment, which is more of a "pull-through" style, retains the upper pivot between the hitch and the tongue but removes the lower pivot in favor of a secure connection between the lower gear box and the hitch, thus causing a measure of the draft loading to be applied to the lower gear box.

Because no tools are required for securing the connection between the draw bar and receiver of the hitch, the user can quickly and easily hook up the implement in the first instance, and just as easily unhook the implement when operations are finished.

BRIEF DESCRIPTION OF THE DRAWINGS

FIG. 3 is an enlarged, fragmentary vertical cross sectional view of the machinery in FIG. 2 illustrating details of construction;

FIG. 3a is a fragmentary, enlarged cross sectional view of the draw bar receiving socket illustrating the manner in which the draw bar can swing up and down about a transverse axis while securely retained by the locking pin;

FIG. 4 is a fragmentary top plan view of the implement, hitch draw bar, the phantom lines illustrating the hitch and draw bar in a sharply turned angular relationship relative to the implement tongue;

FIG. 5 is a vertical cross sectional view through the machinery taken substantially along line 5—5 of FIG. 3;

FIG. 5a is a fragmentary enlarged view of the receiver and draw bar similar to FIG. 5 but illustrating the manner in which the draw bar can rotate to a limited extent about a fore-and-aft axis within the receiver to accommodate side-to-side roll of the tractor relative to the implement.

FIG. 6 is an enlarged, fragmentary cross sectional view of the connection between the hitch and the lower pivotal gear box, illustrating details of connection;

FIG. 8 is a schematic top plan view of a typical tractor and pull-type implement with which the present invention may be advantageously utilized.

DETAILED DESCRIPTION

Figure 1:
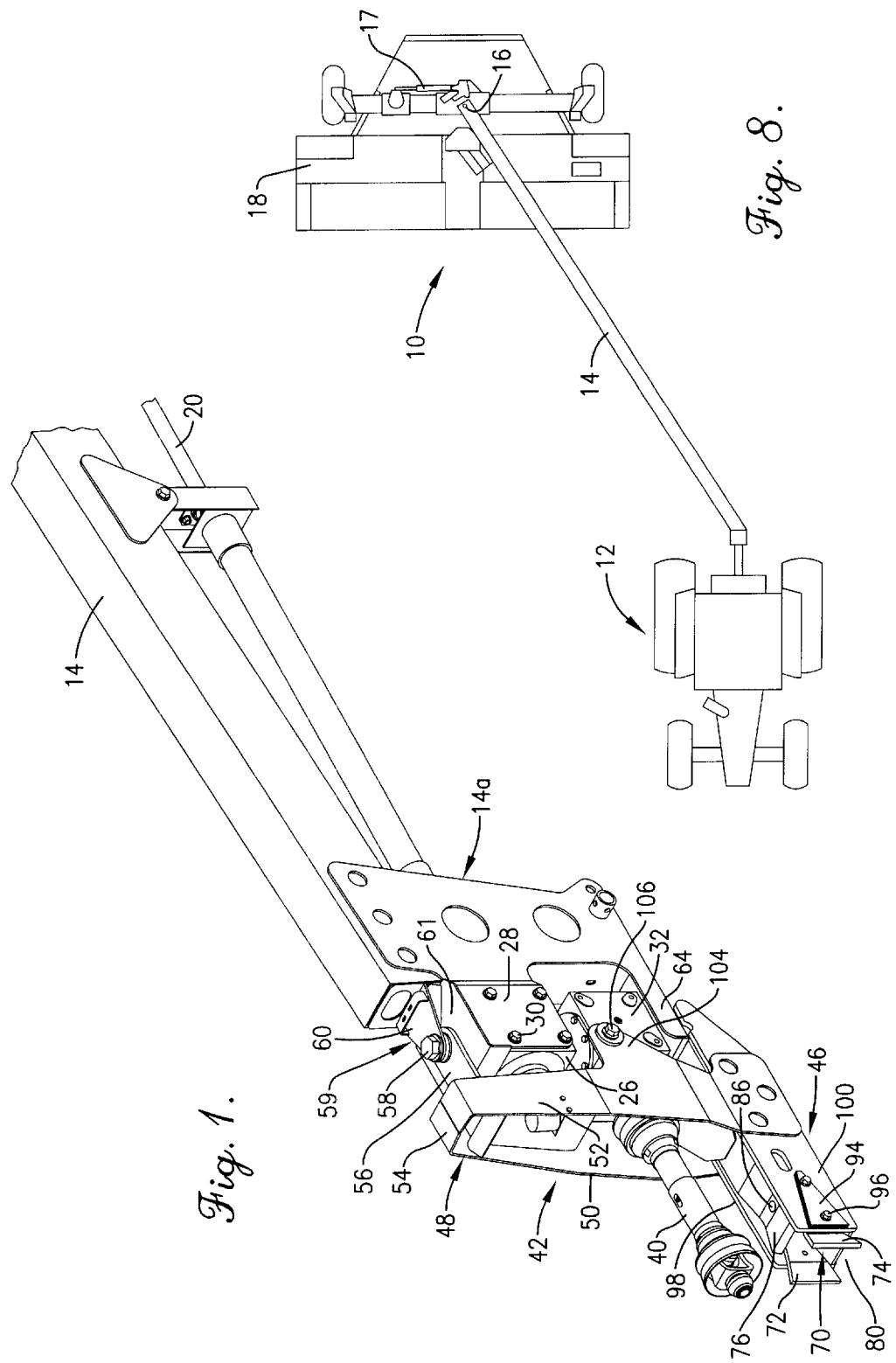
FIG. 1 is a fragmentary isometric view of the front end of the tongue of a pull-type implement employing a draw bar swivel hitch constructed in accordance with the principles of the present invention.

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

FIG. 8 shows a pull type implement 10 attached to a towing tractor 12. Implement 10 has a long, fore-and-aft extending tongue 14 which, in the illustrated embodiment, can be pivoted about an upright axis 16 by a hydraulic cylinder 17 to change the lateral position of the harvesting header 18 relative to tractor 12. Header 18 carries driven components such as rotary cutters and conditioner rolls (not shown), all of which are mechanically driven. A fore-and-aft drive line 20 (FIG. 1) suspended beneath tongue 14 supplies mechanical driving power to such components.

The front end of drive line 20 has a U-joint coupling 22 (FIG. 3) with the rearwardly projecting output shaft 24 of an upper right angle gear box 26. Upper gear box 26 is fixed to tongue 14 and held against rotation relative thereto. Specifically, a depending, structural leg 14a of tongue 14 has a pair of forwardly projecting laterally spaced side plates 28 (FIGS. 1 and 2; only one plate being illustrated) that embrace opposite sides of upper gear box 26 and are secured thereto by a series of bolts 30.

A lower right angle gear box 32 is supported by fixed upper gear box 26 immediately below the same. Lower gear box 32 and upper gear box 26 share a common, upright drive shaft (not shown) housed within a intermediate collar 34 so that the output of lower gear box 32 is received as input by the upper gear box 26. Lower gear box 32 is rotatably supported by upper gear box 26 for swiveling about an upright axis 36 that is common to the axis of rotation of the internal drive shaft between the two gearboxes 26,32. Lower gearbox 32 has an input shaft 37 disposed at right angles to the internal drive shaft between the two gear boxes 26 and 32. Gear boxes 26 and 32 may be obtained as a fully assembled unit from Comer S.p.A. of Reggio Emilia, Italy. A suitable Comer unit is available as pull-through swivel gear box Model T-279D.

The input shaft 37 of lower gear box 32 is connected to the rearwardly extending power take-off shaft 38 of tractor 12 via a U-joint drive line 40. Thus, power to the operating components of implement 10 is derived from the power take-off shaft 38, U-joint drive line assembly 40, input shaft 37 of lower gear box 32, the internal drive shaft between lower gear box 32 and upper gear box 26, output shaft 24 from upper gearbox 26, U-joint 22, and drive line 20.

A swivel hitch broadly denoted by the numeral 42 is adapted for coupling the tongue 14 with the rearwardly extending draw bar 44 of tractor 12 for establishing a draft connection between tractor 12 and implement 10. Hitch 42 is pivotally connected to tongue 14 for left and right pivoting movement about upright axis 36 and serves not only to establish a draft connection for the implement, but also as a means for swiveling lower gear box 32 during turns so as to always keep lower gear box 32 in line with tractor 12. More particularly, it keeps the input shaft 37 substantially in line with the power take-off shaft 38.

Hitch 42 comprises two major components, i.e, a fore-and-aft extending receiver 46 at the bottom of the hitch, and an upright mast 48 that is fixed to receiver 46 and projects upwardly therefrom in front of gear boxes 26 and 32. Mast 48 has a generally inverted, U-shape configuration, presenting a pair of laterally spaced, upright legs 50 and 52 that are interconnected at their upper ends by a bight 54. The lower ends of legs 50 and 52 straddle receiver 46 and are rigidly affixed to opposite side plates 98 and 100. A rearwardly extending bar 56 fixed to legs 50 and 52 a short distance below bight 54 has a pivotal connection 58 at its rear end with a forwardly projecting clevis 59 on the tongue 48 that is defined by an upper lug 60 and a lower plate 61, thereby establishing an upper pivotal connection between hitch 42 and tongue 14. The rear end of receiver 46 correspondingly has a pivotal connection 62 with a forwardly projecting tang 64 at the bottom of leg 14a of tongue 14, thereby establishing a lower pivotal connection between hitch 42 and tongue 14. Pivotal connections 58 and 62 are located on the upright axis 36.

It is to be noted that in one preferred embodiment, upper and lower pivotal connections 58 and 62 comprise ball joints, as illustrated in the drawings. Such ball joints provide a measure of flexibility during initial assembly of the machinery, but it is not intended that pivotal connections 58 and 62 provide for any movement of hitch 42 relative to tongue 14 other than horizontal swinging or swiveling movement about the upright axis 36. Indeed, hitch 42 is held by the pivotal connections 58 and 62 against other than horizontal swinging movement about axis 36. Thus, it is within the principles of the present invention to have pivotal connections 58 and 62 constructed as upright pintles and bushings or collars, for example, instead of ball joints.

An internal, upright, transverse wall 66 interconnects the two legs 50,52 of mast 48 to provide structural rigidity. Transverse wall 66 has an opening 68 at the level of lower gear box 32 to provide clearance for input shaft 37.

Receiver 46 projects forwardly beyond mast 48 and is generally hollow so as to present a fore-and-aft extending socket 70 that receives draw bar 44. Socket 70 is defined by a pair of upright, laterally spaced sidewalls 72 and 74, a transverse top wall 76 extending between sidewalls 72,74, and a transverse bottom wall 78 spaced below top wall 76 and likewise extending between sidewalls 72,74. Sidewalls 72,74, top wall 76 and bottom wall 78 all flare outwardly at the forward end of receiver 46 so as to define an enlarged entry mouth 80 for the socket 70. Socket 70 is generally rectangular in cross sectional configuration.

A backstop 82 projects upwardly from bottom wall 78 at an inwardly spaced location within socket 70 for the purpose of making abutting engagement with the rearmost end of draw bar 44 when the latter is inserted into socket 70. This aligns an upright hole 84 in the draw bar 44 with a pair of corresponding holes 86 and 88 in top and bottom walls 76 and 78 respectively for the common reception of a locking pin 90. Pin 90 is easily inserted into and removed from receiver 46 and thus serves to removably retain draw bar 44 within receiver 46 to fully establish the draft connection between tractor 12 and implement 10. Backstop 82 is selectively adjustable fore-and-aft by virtue of a bolt 91 that attaches backstop 82 to receiver 46 via a fore-and-aft slot 78a in bottom wall 78.

Socket 70 is designed to be somewhat enlarged with respect to draw bar 44. In this regard, it will be noted from FIG. 3 in particular that the vertical dimension of socket 70 is somewhat greater than the thickness of draw bar 44. Furthermore, the diameter of locking pin 90 is somewhat less than that of hole 84 in draw bar 44. Thus, as illustrated in phantom in FIG. 3a, draw bar 44 can pivot up and down to a limited extent within socket 70 about a transverse horizontal axis even while being fully retained by pin 90. This provides adequate freedom of movement for tractor 12 and/or implement 10 to pitch up and down relative to one another during field operations.

Additionally, as shown particularly in FIG. 5, the distance between sidewalls 72 and 74 is somewhat greater than the width of draw bar 44. Thus, as shown in FIG. 5a, draw bar 44 can rotate about a fore-and-aft axis within socket 70 to a limited extent during field operations, even though draw bar 44 is fully retained within socket 70 by pin 90. This limited rotational freedom adequately provides for side-to-side roll of the tractor 12 relative to implement 10 during field operations.

The draw bars of different tractors may vary in width. Accordingly, receiver 46 is provided with two sets of shims 92 and 94 that may be utilized to adjust the effective width of socket 70 as may be necessary or desirable for optimum functionality. In the drawings, shims 92 and 94 are illustrated in their stored positions on the outside surfaces of opposite side plates 98 and 100 of receiver 46. Bolts 96 are utilized to attach shims 92,94 to plates 98 and 100. The same bolts 96 are also used to detachably secure the two sidewalls 72,74 of socket 70 in their positions within receiver 46. To accomplish this arrangement, sidewalls 72 and 74 are drilled and tapped so that bolts 96 are threadably received therein. Shims 92 and 94, on the other hand, are simply drilled to provide clearance holes therethrough. Thus, if socket 70 needs to be narrowed from that illustrated in the figures, bolts 96 are first completely removed, thus releasing shims 92,94 as well as sidewalls 72,74. One or more of the shims 92,94 from each set is then placed on the inside surfaces of side plates 98 and 100, sandwiched between such side plates and the corresponding sidewalls 72,74. The bolts 96 are then replaced and tightened down. It has been found that, in the preferred embodiment, a clearance of approximately one-eighth inch should exist between each side of draw bar 44 and the adjacent sidewall 72 or 74. The magnitude of the clearance can vary to some extent, however, depending upon the nature of the draw bar involved.

Figure 2:
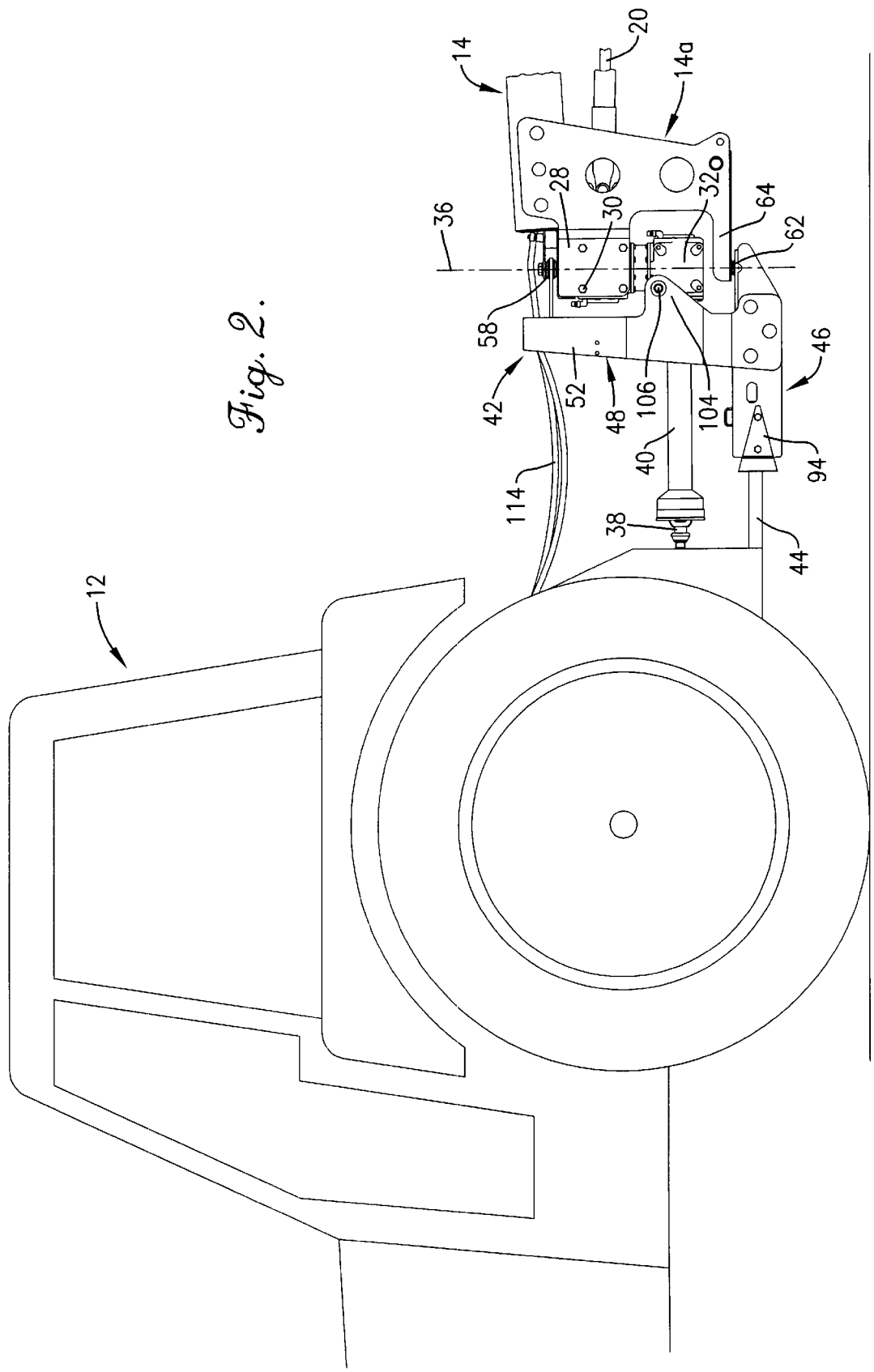
FIG. 2 is a fragmentary side elevational view thereof with the implement hooked up to the draw bar of a towing tractor.

As shown best in FIGS. 1, 2 and 6, mast 48 has a pair of short arms 102 and 104 (see also FIG. 3) that project rearwardly from the legs 50 and 52 respectively to embrace opposite sides of the lower gear box 32. Such embracing relationship causes the lower gear box 32 to be steered by hitch 42 as hitch 42 swivels about upright axis 36 during left and right turns of tractor 12. No draft load is imposed by arms 102 and 104 on lower gear box 32; however, in the preferred embodiment a positive connection is desired. Thus, as illustrated in FIG. 6, a bolt 106 serves this purpose. Although bolt 106 is threaded into the side of lower gear box 32, an enlarged bushing 108 on gear box 32 receives bolt 106 and accommodates a certain amount of misalignment during initial assembly to avoid preloading of lower gear box 32 with any external forces. A washer 110 is clamped against the outboard extremity of bushing 108 by bolt head 106, while a enlarged hole 112 in arm 104 loosely receives bushing 108 to further accommodate misalignment. The construction illustrated in FIG. 6 with respect to arm 104 of mast 42 applies equally for the arm 102 of mast 42 on the opposite side of lower gear box 32.

OPERATION

The operation of the present invention should be apparent from the foregoing. Generally speaking, it will be understood that as the implement 10 is pulled through the field by tractor 12, the draft load is between draw bar 44 and receiver 46 of the hitch 42. In turn, the draft load between hitch 42 and implement 10 is split between the upper and lower pivotal connections 58 and 62. Driving power is, of course, supplied by the tractor power take-off shaft 38 to the gear boxes 26,32 and then to the drive line 20.

As the tractor and implement move through the field, left and right turns can readily be made without adversely affecting the transmission of driving power because lower gear box 32 simply swivels about upright axis 36 with hitch 42 such that the input shaft 37 of lower gear box 32 remains constantly substantially aligned with the power take-off shaft 38. Pitching of tractor 12 relative to implement 10 in an up and down direction is readily accommodated, as draw bar 44 can pivot about its loose reception within socket 70. Likewise, if tractor 12 needs to roll slightly from side-to-side relative to implement 10, that is also readily accommodated by virtue of the loose reception of draw bar 44 within socket 70.

It will be appreciated that the simple loose reception and retention of draw bar 44 within socket 70 permits quick and easy attachment and detachment of the implement to the tractor. With the front of tongue 14 supported upon a jack stand (not shown), the driver need only back up the tractor 12 until draw bar 44 slips into the open mouth 80 of socket 70. Continued backing of the tractor until draw bar 44 abuts back stop 82 assures that the hole 84 within draw bar 44 becomes vertically aligned with holes 86 and 88 of receiver 46. Thereupon, the user need only drop locking pin 90 into place through the aligned holes, securing draw bar 44 to receiver 46. As well understood by those skilled in the art, various types of keepers may be provided to prevent pin 90 from accidentally escaping from the receiver 46 once the hook-up has been completed.

After draw bar 44 has been secured to receiver 46, the operator need only remove the jack stand, hook-up the U-joint drive line 44 to the power take-off shaft 38, and connect hydraulic hoses 114 to the appropriate ports on tractor 12. Obviously, disconnection of the implement from the tractor is a simple reversal of this process.

ALTERNATIVE EMBODIMENT

Figure 7:
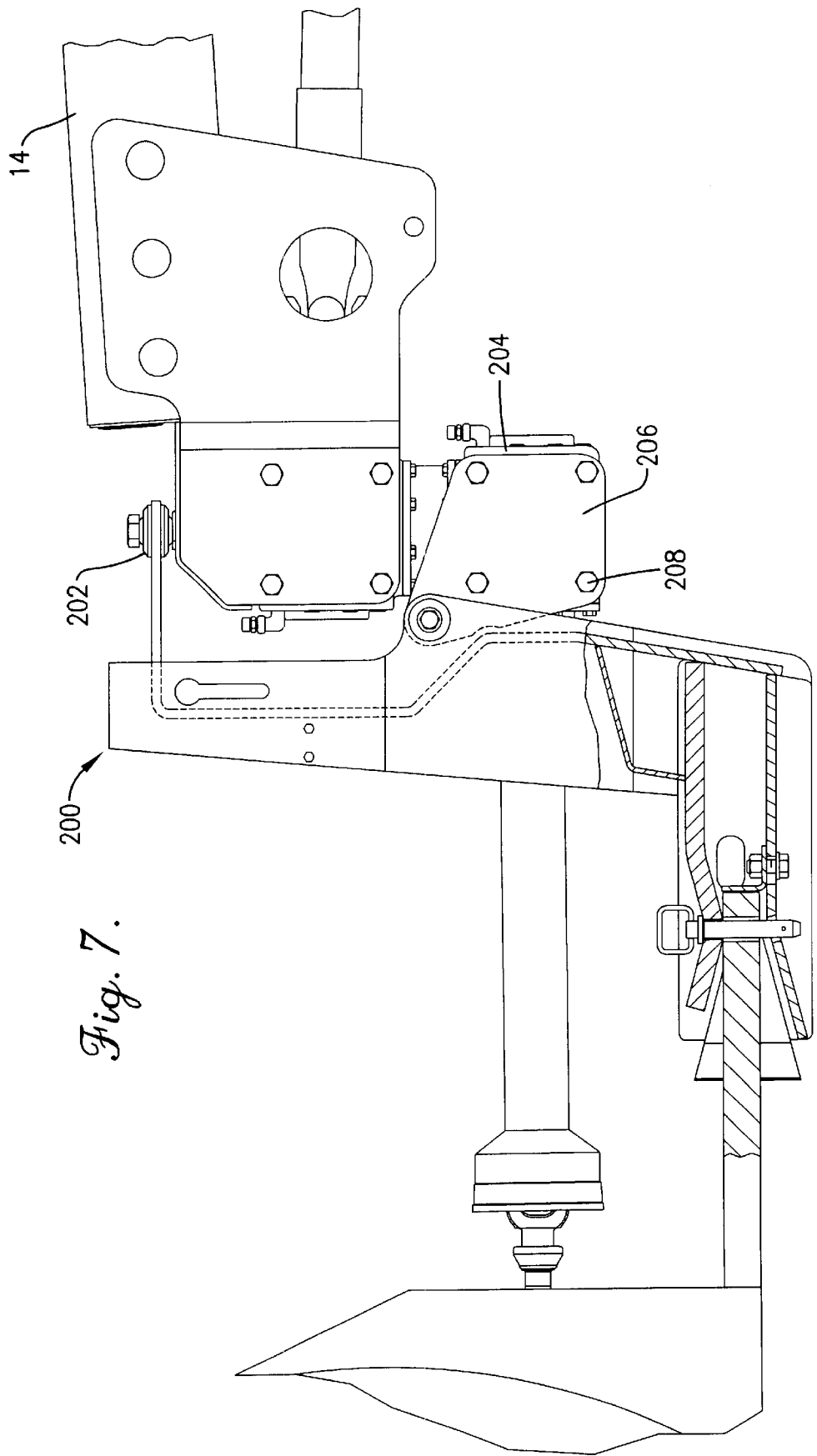
FIG. 7 is a side elevational view of a second embodiment of the invention in which some degree of draft load is placed upon the lower gear box.

FIG. 7 illustrates a hitch 200 having no lower pivotal connection with the tongue 14 that would provide a lower draft connection with the tongue. Instead, while the upper pivot connection 202 provides one draft connection, the other is provided by a connection between the hitch 200 and lower gear box 204. In this regard, rearwardly projecting, laterally spaced arms 206 (only one being shown) are bolted to opposite sides of the lower gear box 204 by bolts 208. Thus, hitch 200 not only steers lower gear box 204 through arms 206, but also transmits some of the pulling force to tongue 14 through such arms. In all other respects, the embodiment of FIG. 7 is identical to that of FIGS. 1–6.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

What is claimed is:

1. In a pull-type farm implement having driven operating components, the improvement comprising:

a tongue;

a drive line carried by the tongue for supplying driving power to said components;

an upper right angle gear box fixed to the tongue and operably coupled with said drive line;

a lower right angle gear box operably coupled with the upper gear box, said lower gear box being supported for swiveling movement about an upright axis passing through the two gear boxes, said lower gear box having an input shaft adapted to be operably coupled with a power take-off shaft of a towing vehicle;

a hitch pivotally connected to the tongue for horizontal swinging movement about said upright axis, said hitch including a receiver having a forwardly opening socket configured to accept the rearwardly extending draw bar of the towing vehicle; and a connector for releasably retaining the draw bar within the receiver to establish a draft connection between the towing vehicle and the tongue that allows the tongue and the vehicle to turn left and right about said axis relative to one another during field operations, said hitch remaining substantially in line with the vehicle during such turns and being operable to swivel the lower gear box about said axis to the extent necessary to keep the input shaft of the lower gear box substantially aligned with the power take-off shaft of the towing vehicle, said socket of the receiver being configured to allow the draw bar a limited amount of up and down pivoting movement about a transverse axis relative to the receiver and a limited amount of rotational movement about a fore-and-aft axis relative to the receiver when the draw bar is retained in the socket by the connector.

2. In an implement as claimed in claim 1, said lower gear box being supported by the upper gear box.

3. In an implement as claimed in claim 1, said hitch having an upper pivotal connection with the tongue above the upper gear box and a lower pivotal connection with the tongue below the lower gear box.

4. In an implement as claimed in claim 3, said pivotal connections both comprising ball joints.

5. In an implement as claimed in claim 1, said receiver including a rear end located below the lower gear box and having a lower pivotal connection with the tongue, said hitch including a mast fixed to said receiver and projecting upwardly therefrom forwardly of the gear boxes, said mast including an upper end having an upper pivotal connection with the tongue.

6. In an implement as claimed in claim 5, said mast having a pair of laterally spaced, rearwardly projecting arms that embrace the lower gear box on opposite sides thereof to cause swiveling of the lower gear box with the hitch.

7. In an implement as claimed in claim 6, each of said arms having a fastener that loosely couples the arm to the corresponding side of the lower gear box.

8. In an implement as claimed in claim 1, said socket having a pair of laterally spaced sidewalls and a pair of vertically spaced top and bottom walls, said socket having an entry mouth at one end thereof, said sidewalls and said top and bottom walls being outwardly flared at said mouth of the socket to facilitate insertion of the draw bar.

9. In an implement as claimed in claim 8, said sidewalls being adjustable toward and away from one another to compensate for draw bars of different widths.

10. In an implement as claimed in claim 8, said socket having a backstop spaced inwardly from said mouth in position for abutting engagement with the draw bar when the draw bar is fully inserted into the socket.

11. In an implement as claimed in claim 10, said receiver having a hole disposed to be in alignment with a hole in the draw bar when the draw bar abuts said backstop, said connector comprising a pin receivable within the aligned holes of the receiver and the draw bar.

12. In an implement as claimed in claim 1, said receiver having a hole disposed to be in alignment with a hole in the draw bar when the draw bar is fully inserted into the socket, said connector comprising a pin receivable within the aligned holes of the receiver and the draw bar.

13. In an implement as claimed in claim 1, said hitch including a mast fixed to said receiver and projecting upwardly therefrom forwardly of the gear boxes, said mast having an upper end located above the gear boxes and having a pivotal connection with the tongue at said upright axis, said mast having a pulling connection with the lower gear box, said receiver having no connection with the tongue such that the draft connection between the towing vehicle and the tongue is established by the pivotal connection between the mast and the tongue and the pulling connection between the mast and the lower gear box.

14. In an implement as claimed in claim 13, said mast having a pair of laterally spaced, rearwardly extending arms that embrace the lower gear box and are fastened to opposite sides thereof.

\* \* \* \* \*